United States Patent
Ho

(10) Patent No.: US 8,230,219 B2
(45) Date of Patent: Jul. 24, 2012

(54) REDUCED COMPUTATION FOR BIT-BY-BIT PASSWORD VERIFICATION IN MUTUAL AUTHENTICATION

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 422 days.

(21) Appl. No.: 12/540,017

(22) Filed: Aug. 12, 2009

(65) Prior Publication Data
US 2010/0042839 A1 Feb. 18, 2010

Related U.S. Application Data

(60) Provisional application No. 61/088,265, filed on Aug. 12, 2008, provisional application No. 61/148,637, filed on Jan. 30, 2009, provisional application No. 61/149,233, filed on Feb. 2, 2009.

(51) Int. Cl.
*H04L 9/00* (2006.01)
(52) U.S. Cl. ......... 713/168; 713/169; 713/171; 713/181
(58) Field of Classification Search .......... 713/168–171, 713/181; 380/277, 281–282, 284–285, 44; 726/2–3
See application file for complete search history.

(56) References Cited

U.S. PATENT DOCUMENTS

| | | | |
|---|---|---|---|
| 6,226,383 B1 * | 5/2001 | Jablon | 380/30 |
| 6,249,585 B1 * | 6/2001 | McGrew et al. | 380/286 |
| 6,757,825 B1 * | 6/2004 | MacKenzie et al. | 713/169 |

* cited by examiner

*Primary Examiner* — Hosuk Song
(74) *Attorney, Agent, or Firm* — Steven A. Shaw; W. James Brady; Frederick J. Telecky, Jr.

(57) ABSTRACT

Authentication methods are provided that allow for superior security, power consumption, and resource utilization over existing authentication methods. By computing only two hashes of a shared secret password for each protocol run, the methods described in this disclosure dramatically reduce the computational power needed to perform authentication. Similarly, by exchanging these hashes bitwise or piecewise for verification, rather than performing new hashes including each bit of the password separately, the methods described in this disclosure reveal less information about the password being authenticated than existing methods. The methods described in this disclosure also allow for authentication using fewer messages and with lower latency, reducing the amount of operational power used in the authentication process.

31 Claims, 5 Drawing Sheets

REDUCED COMPUTATION FOR BIT-BY-BIT PASSWORD VERIFICATION IN MUTUAL AUTHENTICATION

CROSS-REFERENCE TO RELATED APPLICATIONS

This application is related to, and claims priority under 35 U.S.C. §119(e) to provisional application Ser. No. 61/088,265 filed Aug. 12, 2008 entitled "Reduced Computation for Bit-by-Bit Password Verification in Mutual Authentication," the teaching of which are incorporated by reference herein.

This application is a non-provisional application claiming priority under 35 U.S.C. §119(e) to provisional application Ser. No. 61/148,637 filed on Jan. 30, 2009, entitled "Reduced Computation for Bit-by-Bit Password Verification in Mutual Authentication," the teachings of which are incorporated by reference herein.

This application is related to, and claims priority under 35 U.S.C. §119(e) to provisional application Ser. No. 61/149,233 filed Feb. 2, 2009 entitled "Medium Access Control (MAC) and Security Operation for Body Area Networks," the teaching of which are incorporated by reference herein.

STATEMENT REGARDING FEDERALLY SPONSORED RESEARCH OR DEVELOPMENT

Not applicable.

BACKGROUND

1. Field

This invention generally relates to data communications and security. More particularly, embodiments of the invention relate to mutual authentication of two communicating parties through password hash verification without revealing the password.

2. Background Information

Current wireless authentication through password verification systems suffer from two major deficiencies: high computational requirements and easy defeat by guessing.

Computationally intensive password based authentication protocols require the communicating devices to expend power beyond that required by sending and receiving messages. For example, the password-based authentication method specified for Bluetooth entails a recomputation of the hash and a reselection of the supporting nonces for the verification of each bit of the password. This requires that Bluetooth devices have adequate processors to complete these computations within the time allowed as well as adequate power supplies. This increases the size and cost of Bluetooth devices while limiting their useful lifetime between charges.

With electronic devices becoming smaller and more ubiquitous, there is a need for password based authentication protocols that are effective at preventing adversary attacks while requiring little power. Medical sensors, for example, must be very small to be both safe and effective. The size constraint limits processor and battery capacity, which in turn limits how long a device can be useful. The outputs from these sensors are used to determine treatment, and may in the future provide a feedback mechanism for automated treatments. With such devices, the inability to authenticate the identity of the device could have deadly consequences.

BRIEF SUMMARY OF THE PREFERRED EMBODIMENTS OF THE INVENTION

In order to address these and other problems, this disclosure details mutual authentication protocols based on password hash verification that provide protection better than current protocols with lower computational requirements. The disclosure contemplates the use of this protocol with wireless devices, though its application is not limited to such devices.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Overview

Figure 1:
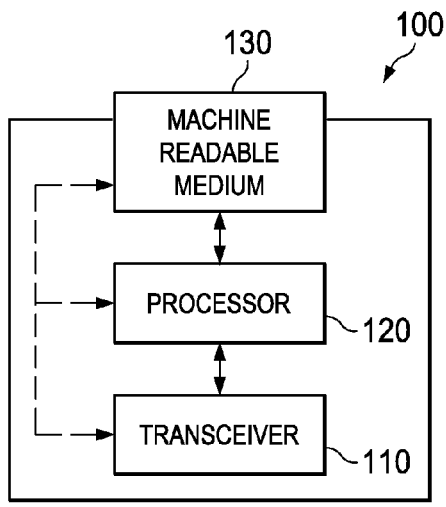
FIG. 1 illustrates a network device.

Authentication protocols play a key role in modern communication systems. These protocols, and the devices that implement them, ensure that any two parties communicating over a network or via wireless transmission are communicating with the intended counterparty. Attempts to fool one or both parties in order to obtain information or deceive a party into acting in a manner beneficial to the intruding party are common, so authentication protocols, and their implementations, are constantly tested.

At the same time, many devices have severe constraints on battery or processor power that limit the computational complexity and hence security strength of authentication protocols. In these devices especially, achieving adequate security with economy is important.

This disclosure will illustrate the devices used to implement novel authentication protocols based on password hash verification, devices implementing these protocols, and compare attack vectors against these protocols with attack vectors against other protocols. This disclosure will go on to illustrate different embodiments of this novel protocol, including authentication through both bitwise and piecewise password hash verification.

Notation and Nomenclature

This disclosure refers to several ideas known in the art. A Diffie-Hellman key exchange is a protocol that allows two parties to exchange information over an insecure channel to establish a shared secret. This shared secret can then be used to obfuscate information sent over that channel in a way that only those possessing the secret can reverse. A Diffie-Hellman key exchange protects against eavesdropping attacks provided that eavesdroppers never learn the information private to either party of the exchange. Diffie-Hellman offers no protection against a man-in-the-middle attack, where an attacker I impersonates party A to party B and party B to party A, fooling B into believing A is talking to B and fooling A into believing B is talking to A. Diffie-Hellman is not resistant to impersonation attack either, where an intruder impersonates a legitimate party to engage in an information exchange with another legitimate party. Such attacks can be defeated by authenticating the two legitimate parties to each other through some private information, e.g. a password that is shared only between the two parties.

A hash is a well-defined procedure which converts a variable-sized amount of data into an output datum, normally with a fixed size smaller than the input data. The output value for a given input need not be unique, and normally is not. However, the same input should always have the same output. For the protocols discussed in this disclosure, hashes which produce very dissimilar outputs for similar inputs are preferred because they make guessing the hashed value difficult.

A nonce is a random number, typically generated once and used only for an instance of a protocol run. Authentication and other security protocols typically hash combined random numbers and shared secrets to change output values from one protocol run to the next so as to thwart offline dictionary attacks.

Publicly known information, or public information, is information that is freely revealed. For example, a device's public key is publicly known. During a run of an authentication protocol, it is normal to reveal the public keys of the two communicating parties for use in the protocol. These are considered public information because they are known by the two parties and any eavesdropping third parties before or during the protocol run.

Network Device

The protocols of this disclosure are performed by network devices. While the implementation of these network devices varies widely from one manufacturer or purpose to another, these devices share several basic characteristics.

FIG. 1 illustrates such a device. The device 100 is comprised of three essential components: a transceiver 110, a processor 120, and a machine-readable medium 130.

The transceiver 110 sends signals to and receives signals from other devices. These transceivers are well understood in the art. For wired devices, these transceivers 110 entail devices capable of sending and receiving signals over twisted pair copper wires, coaxial cable, or optical fiber. For wireless devices, these transceivers entail sending and receiving electromagnetic waves carrying desired signals without a wired medium. Wireless devices generally operate between 3 kHz and 300 GHz. Wireless devices could also use higher frequency electromagnetic radiation, such as infra-red or visible light, under appropriate conditions. Other signal types, such as sound waves, are also possible. A network device may have more than one transceiver. For example, wireless LAN routers typically have both a wireless transceiver and a wired transceiver.

The processor 120 interprets the signals received from the transceiver 110, parsing them into a useful form. The processor 120 also formats signals to send to the transceiver 110 for transmission. The processor 120 further manipulates data to support a protocol run. The processor 120 typically has a local machine readable medium, such as random access memory (RAM), which allows the temporary storage of signal data for later conversion and transmission. The processor may be an instruction based processing unit embedded into the device or a hardwired state machine designed to handle the specific tasks of a protocol.

The transceiver 110, processor 120, and machine readable medium 130 may be directly connected with one another or the machine readable medium 130 may be connected to the processor which may then be connected to the transceiver.

Network devices may also have other components. For example, many network devices, such as personal computers and telephones, have input and output components distinct from the physical network device in the form of speakers, microphones, screens, keypads, keyboards, etc. Network devices used as sensors may have other input components including, but not limited to, temperature, chemical, optical, electrical, and mechanical sensing units.

Existing Password Based Authentication Protocols

This disclosure deals principally with novel authentication protocols based on password hash verification that are superior to prior authentication protocols based on password verification. In order to illustrate the superiority of the novel protocols, this disclosure will first review an exemplar prior authentication protocol.

Figure 2:
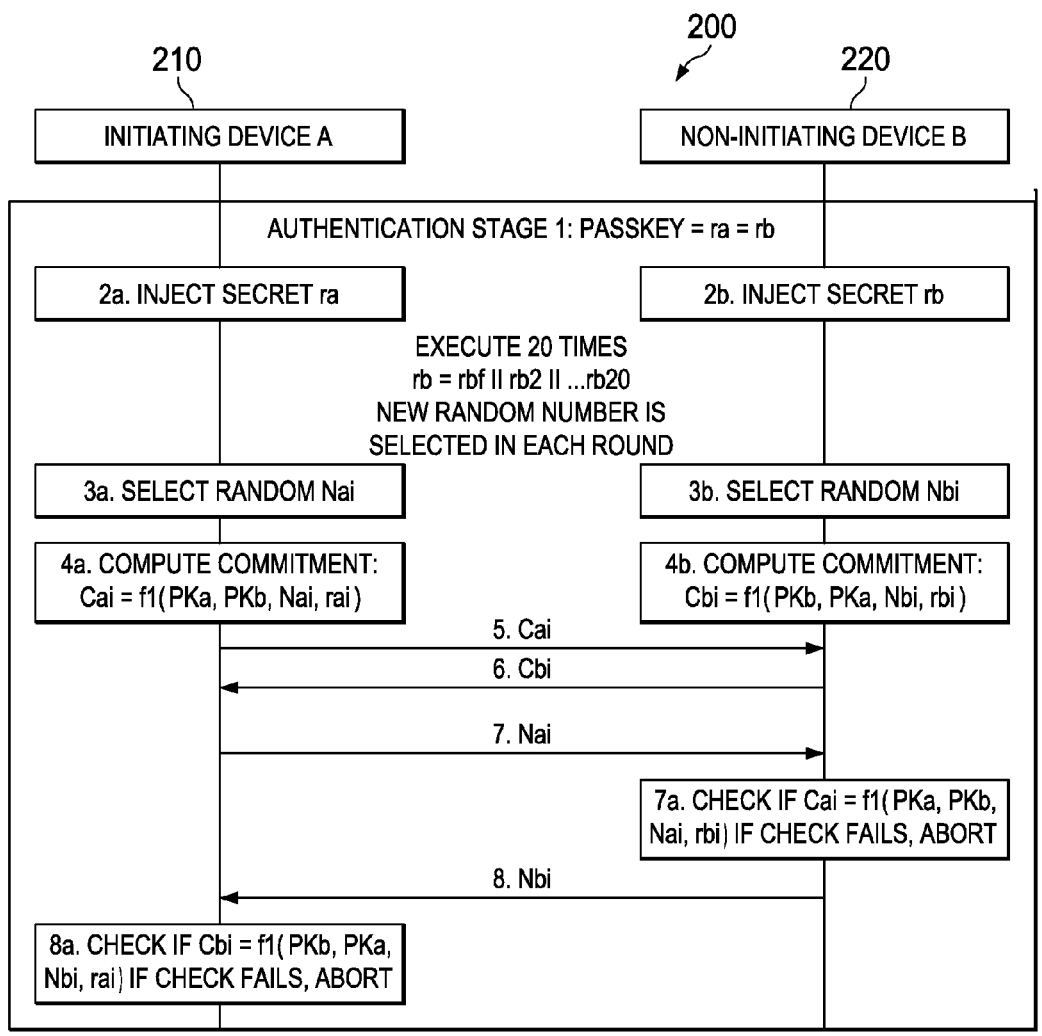
FIG. 2 illustrates two network devices engaging in mutual authentication through password verification according to the Bluetooth protocol.

FIG. 2 depicts two network devices using the Bluetooth authentication protocol based on bitwise password verification. In this protocol 200, for each bit of the shared password or secret between the two network devices, each device generates a random number, computes two hashes, and sends two messages. The two network devices, A 210 and B 220, are attempting to authenticate each other by verifying that they share a secret, i.e., that ra=rb, without directly revealing the secret. According to the protocol 200, the initiating device 210 (here A) takes a bit from its secret, concatenates it with the public keys of device A 210 and device B 220, and performs a keyed hash on the resulting number using its random number as the key (4a). Device A 210 then sends hash result to device B and device B 220 performs its hash calculation and sends the result to device A (5, 6). Then device A 210 reveals its random number to device B 220, which computes the hash computed and sent by device A 210 earlier (7, 7a). If the computed and received hashes match, B 220 reveals its random number to device A 210, which performs a similar check (8, 8a). If A's check succeeds, the process is repeated for the next bit of the password.

This password based authentication protocol has a significant weakness. A third party can simply record the exchanges and find out each bit of the password by a single hash computation. For example, after device A 210 sent its random number in a particular round, the third party can compute A's corresponding hash by assuming the corresponding password bit to be 0. If this computed hash equals the corresponding recorded hash, that password bit is indeed 0; otherwise the password bit is 1. Thus, an adversary can readily extract the password without even having to mount an active attack by impersonating device A or B and engaging in a protocol run with the other device. It takes no special design for a device to be able to receive and store received data and then download the data to a home or office PC to calculate the hashes and hence obtain the bits of the password. Once a third party has the password, it can impersonate a legitimate party to exchange forged information with, and extract desired information from, another legitimate party, breaching the security altogether.

Reduced Computation Protocol for Mutual Authentication through Bitwise or Piecewise Password Hash Verification This disclosure introduces novel protocols for mutual authentication through password hash verification. The protocols are not subject to passive attacks and offer stronger security than the protocol discussed above while requiring fewer hash computations and message exchanges. This allows devices using these novel protocols to consume less power and achieve smaller pairing or association latency while achieving increased security. In turn, this allows for smaller, more efficient, and more reliable network devices.

The novel authentication protocols discussed here will be discussed in two forms. First, this disclosure will discuss a bitwise protocol where two networked devices verify one bit of a password hash at a time. Second, this disclosure will discuss a piecewise protocol where two networked devices verify one piece of the password hash at a time. The bitwise protocol is a special case of the piecewise protocol where the piece size is one bit.

Figure 3:
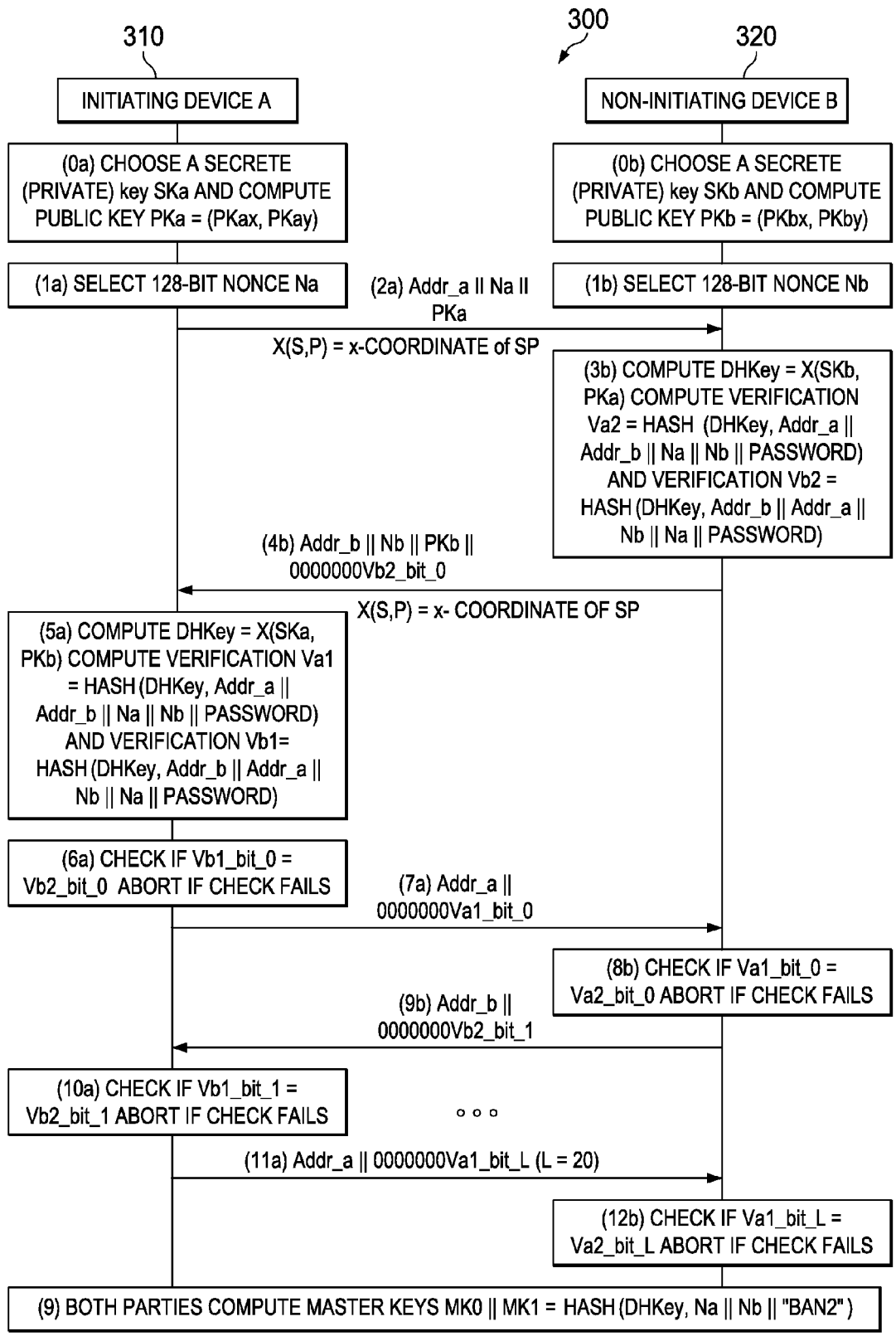
FIG. 3 illustrates two network devices engaging in mutual authentication through an embodiment of the bitwise password hash verification protocol in accordance with an embodiment of the invention.

FIG. 3 illustrates a bitwise protocol 300.

First, the initiating device ("device A") 310 generates a random number and sends that random number, its address and public key for a Diffie-Hellman key exchange to a non-initiating device ("device B") 320.

The non-initiating device (device B 320) has its own random number, address, and public key. After device B 320 receives device A's message, device B derives a shared secret, referred to as Diffie-Hellman key ("DHKey") here, based on device A's message, device B's message, and device B's own private key. Device B 320 then uses the DHKey to key two hashes. The first hash operates on a concatenation of device A's address, device B's address, device A's random number, device B's random number, and their secret password. The second hash also operates on a concatenation of the same parameters, except with those parameters concatenated in a different order than for the first hash. When these two hash functions are completed, device B 320 sends to device A 310 its address, its random number, its public key, and a verification bit such as the least significant bit of one of its hashes.

Upon receiving device B's message, device A 310 performs a counterpart process, deriving the DHKey and computing the hashes keyed by the DHKey on the addresses, random numbers, and password concatenated in the same order as the hashes computed by device B 320. Device A 310 then compares the verification bit sent by device B 320 to the corresponding verification bit from its own computed hash for that address, random number, and password order. If the bits match, device A 310 sends a verification bit such as the least significant bit of the other hash to device B 320. If the bits fail to match, device A 310 aborts the authentication process.

If device A 310 did send the message containing the verification bit from the second hash, device B 320 performs a check against the corresponding verification bit from its second hash. If that check fails then device B 320 aborts the authentication process. If that check succeeds device B 320 and device A 310 exchange another verification bit, such as the second least significant bit, from the first and second hashes, respectively, for another round of mutual checks.

This process of exchanging verification bits from the two hashes continues until either one of the devices fails a check or all checks succeed, at which point the two devices are considered to have successfully authenticated each other. Subsequently, the two devices each compute their shared master key based on their DHKey and their random numbers used in the earlier mutual verifications of the protocol run. Preferably, a standardized one-way cryptographic hash function based on the DHKey will be used in the computation of the shared master key. The master key is then used directly or indirectly to secure data communications between the two devices. When used to secure data communication directly, the master key is used as the key to secure, i.e., to encrypt and authenticate, the data communications. When used to secure data communication indirectly, the master key is used through a one-way cryptography hash function to create another shared secret key, often referred to as the session key in the security community, which is then used to encrypt and authenticate the data communications.

Figure 4:
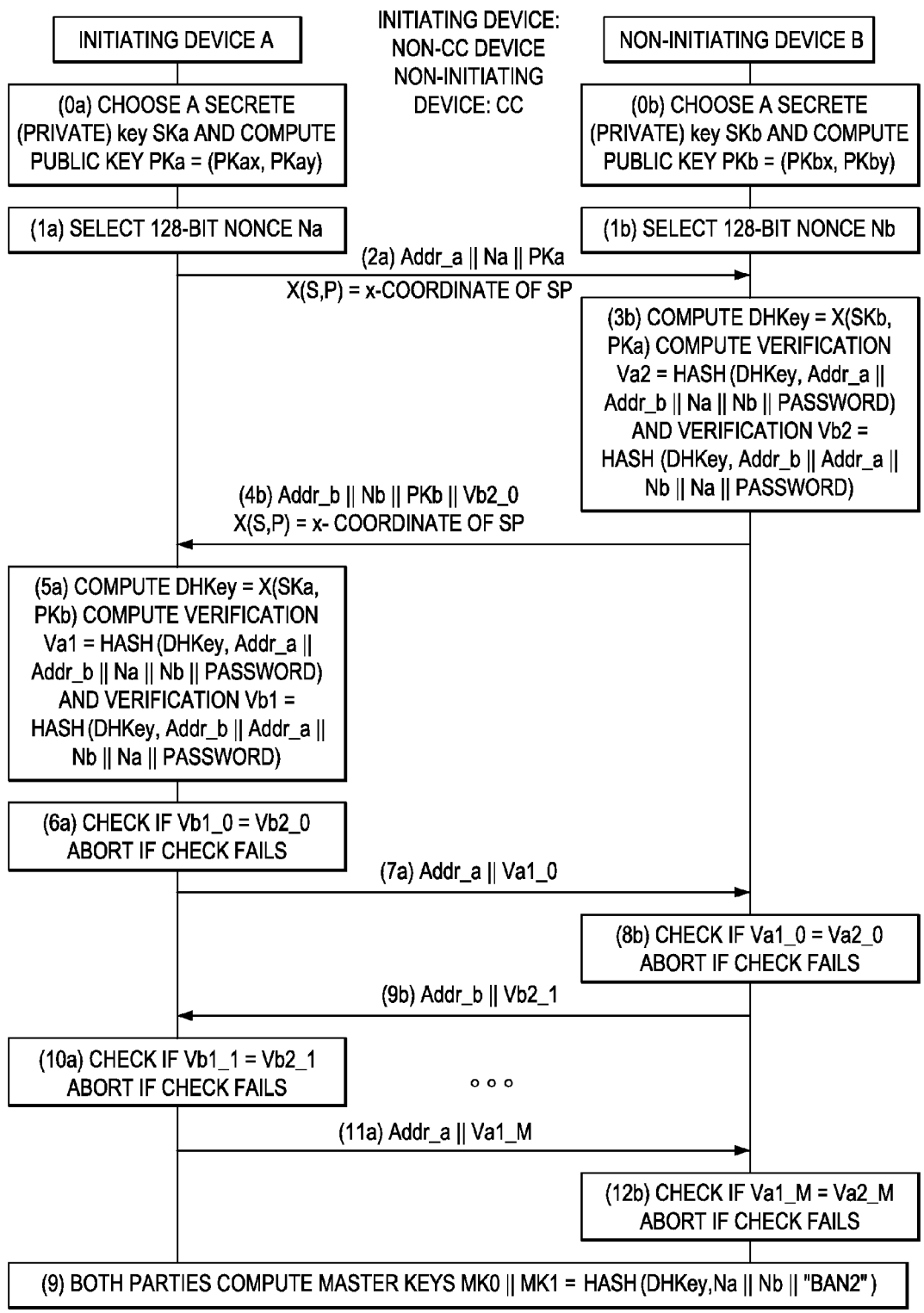
FIG. 4 illustrates two network devices engaging in mutual authentication through an embodiment of the piecewise password hash verification protocol in accordance with an embodiment of the invention.

A piecewise protocol, illustrated in FIG. 4, is similar to the bitwise protocol but instead of exchanging a single bit of each hash, the piecewise protocol sends a piece of each hash, where each piece comprises multiple bits of the hash.

While the protocols illustrated in FIG. 3 and FIG. 4 depict each device computing two hashes and exchanging one hash while keeping the other hash secret, any two distinct complimentary sets derived from the hashes could be used. Each device could even compute only one hash. For example, each of the devices could divide the computed hashes or hash in half, with one device exchanging the most significant half one bit or piece at a time while the other exchanges the least significant half one bit or piece at a time. The two devices could also, for example, alternate, with one device exchanging the odd hash bits and the other exchanging the even hash bits. The two devices need not equally apportion the exchanged bits. For example, one device may be required to disclose three hash bits for each its counterpart device discloses. Any combination is permissible so long as each device is required to exchange at least one verification bit.

In the novel protocols disclosed here, a third party cannot passively record the exchanged messages and then figure out the password shared between the two legitimate parties, because the third party would not know the DHKey which was needed to compute the two hashes but was known only to the two communicating parties. An active third party may impersonate a legitimate party to engage in an exchange with another legitimate party, but in each round of verification bit or piece exchange the third party can only find out a bit or a piece of one of the hashes but not a bit or piece of the password itself. Therefore, these protocols are also more resistant to active attacks. Moreover, these protocols require only two hash computations for each device for the entire authentication procedure, rather than two for each bit of the password, as proscribed by the Bluetooth protocol. They also reduce the number of messages exchanged in each verification round from four to two, further saving the operational power and shortening the authentication latency.

Figure 5:
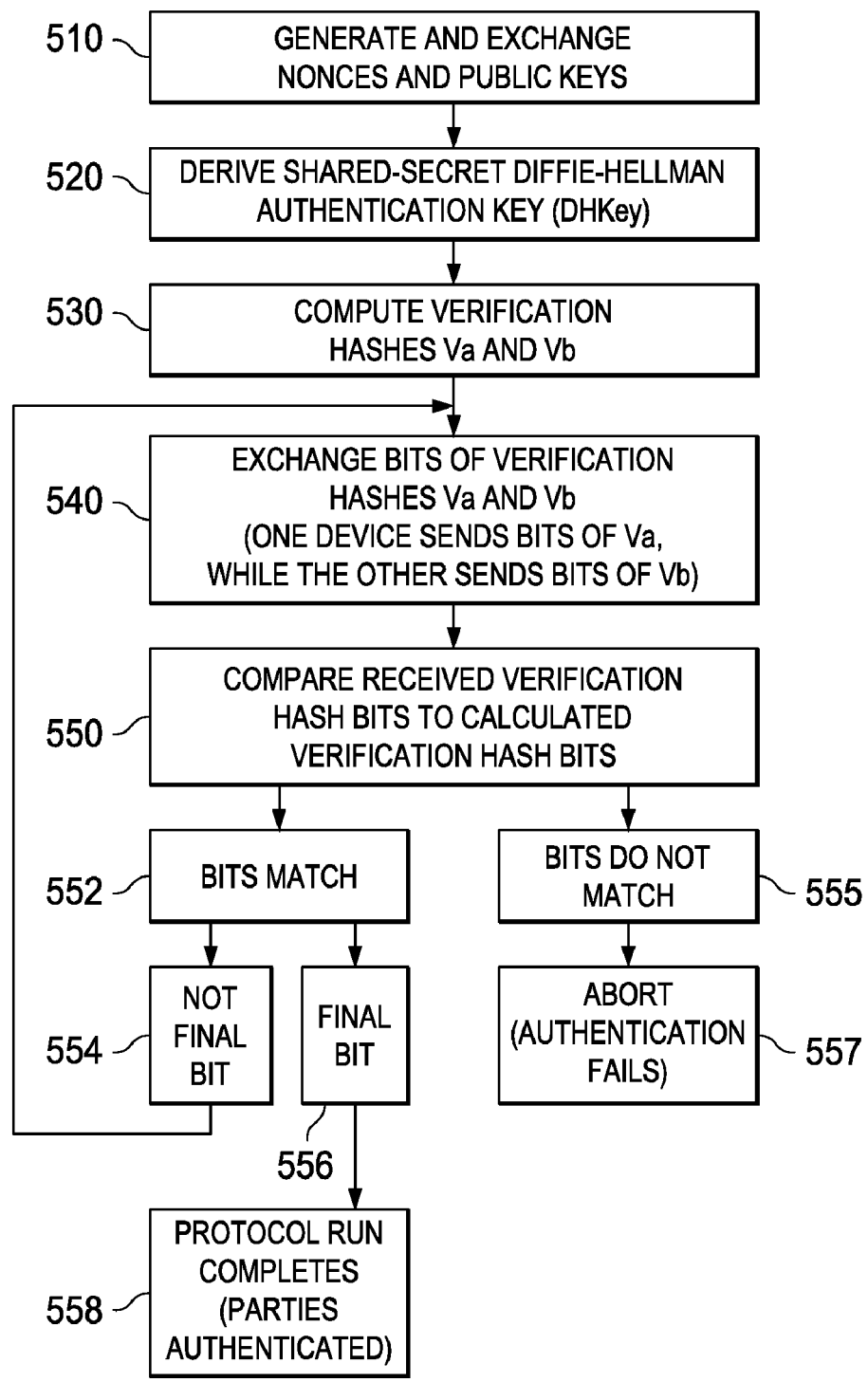
FIG. 5 illustrates an embodiment of the authentication protocol based on bitwise password hash verification in accordance with an embodiment of the invention.

The essential steps of the protocol 500 are described in FIG. 5. At step 510 the devices generate and exchange nonces and public keys. The devices first engage in a Diffie-Hillman key exchange to derive a shared secret key 520, and then use the resulting shared secret key to compute two distinct hashes 530 on a combination of publicly known values and the secret password. Each device keeps one hash result private and sends the other, one bit or one piece at a time 540, to the other device for verification 550. If verification fails—bits do not match 555—then the process is aborted 557. If it succeeds due to bits match 552,then the next bit or piece is sent if not final bit 555. Once all desired bits or pieces are verified—final bit 556—the devices' identities are mutually authenticated 558.

Figure 6:
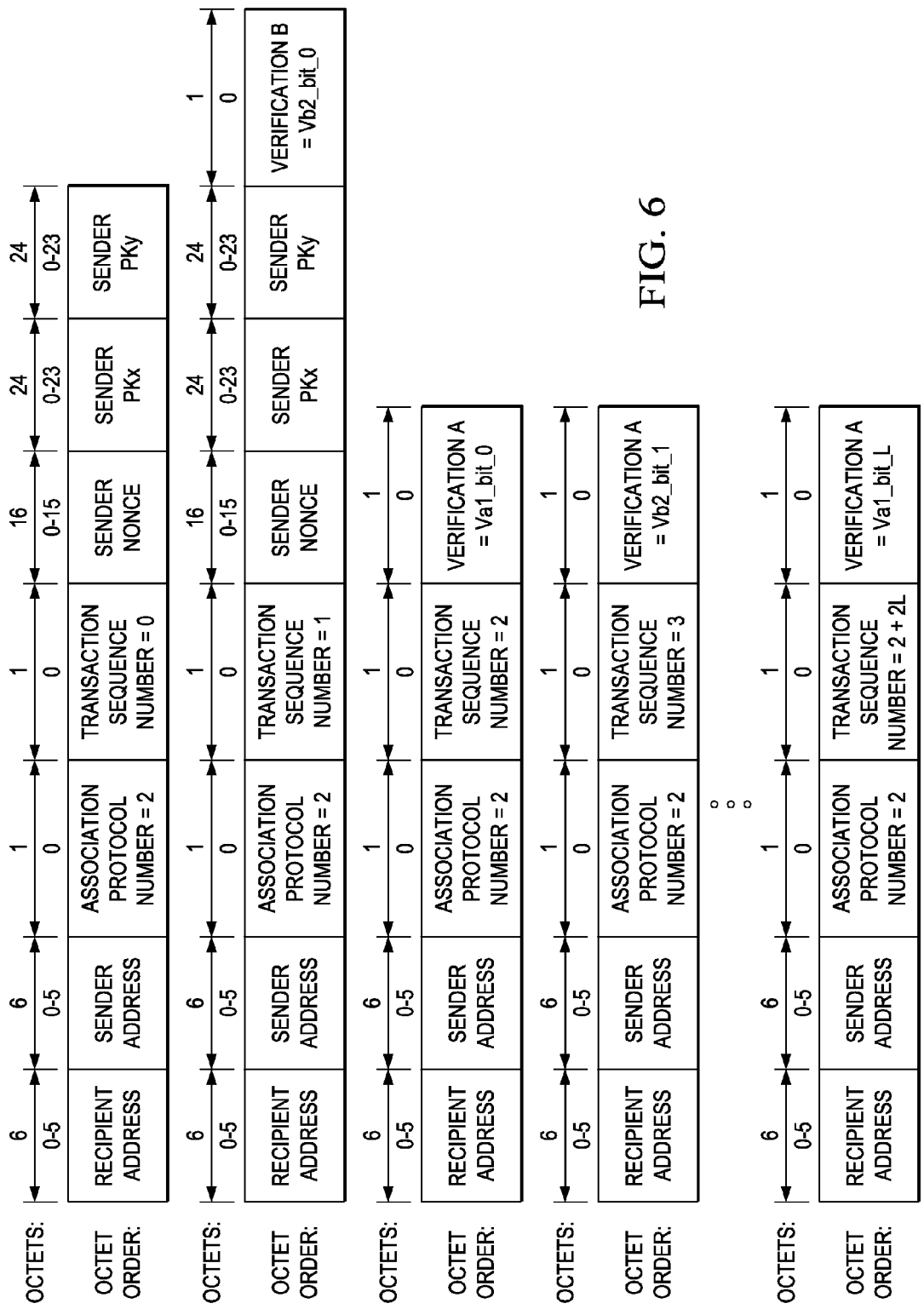
FIG. 6 illustrates frame payloads used in an embodiment of the authentication protocol based on bitwise password hash verification in accordance with an embodiment of the invention.

FIG. 6 shows the frame payload format for one embodiment of the protocol described in the present disclosure. In this embodiment, the devices are using an elliptical curve cryptography algorithm for Diffie-Hellman key exchange and are transmitting a single bit of verification hash in each round of mutual verification. The frames also keep track of which bit is being sent using the transaction sequence number field.

While the protocol has been described here with reference to specific devices and using specific implementation details, those skilled in the art will appreciate that certain substitutions, alterations, or omissions may be made to the embodiments without departing from the spirit of the disclosure. Accordingly, the foregoing description is meant to be exemplary only and should not limit the scope of the invention as set forth in the claims.

What is claimed is:

1. A network device comprising
    a transceiver;
    a processor; and
    a machine readable medium,
    wherein said processor performs an authentication procedure between said network device and a second network device, said procedure comprising:
        a Diffie-Hellman key exchange between said network device and said second network device to create a shared secret key;
        computing two hashes based on said secret key, two different combinations of publicly known information, and a secret password;
        keeping one of said hashes secret resulting in a secret hash and a non-secret hash;
        exchanging said non-secret hash one bit at a time with a non-secret hash of said second network device;
        comparing bits received from said second network device to the corresponding bits within said secret hashes;
        stopping exchange of said non-secret hash whenever an exchanged bit fails to match corresponding secret hash bit and sending a next bit of said non-secret hash when an exchanged bit matches its corresponding secret hash bit; and
        completing said authentication procedure once all desired bits of said non-secret hashes have been exchanged and no exchanged bits have failed to match the corresponding secret hash bits.

2. The network device of claim 1, wherein said network device, upon completing said authentication procedure with said second network device, computes a shared master key based on said secret key and a combination of publicly known information.

3. The network device of claim 2, wherein said shared master key secures subsequent communication with said second network device.

4. The network device of claim 1, wherein said authentication procedure further comprises each said network device computing a shared master key based on said secret key and a combination of publicly known information.

5. The network device of claim 1, wherein said non-secret hash bits are sent in order from least significant to most significant.

6. The network device of claim 1, wherein said hashes are publicly standardized hash functions.

7. The network device of claim 1, wherein said publicly known information comprises a nonce.

8. The network device of claim 1, wherein said publicly known information comprises an address of one of the network devices.

9. The network device of claim 1, wherein said processor performing said authentication procedure is a hardwired state machine.

10. The network device of claim 1, wherein said processor performing said authentication procedure is based on instructions stored in said machine readable medium.

11. A network device comprising:
    a transceiver;
    a processor; and
    a machine readable medium;
    wherein said processor performs an authentication procedure between said network device an another network device, said procedure comprising
        a Diffie-Hellman key exchange between said first network device and said other network device to create a shared secret key;
        each said first network device computing two hashes based on said secret key, two different combinations of publicly known information, and a secret password;
        each said first network device keeping one of said hashes secret;
        each said first network device exchanging its non-secret hash one piece at a time;
        each said network device comparing pieces received from the other network device to the corresponding pieces within said secret hashes;
        each said network device stopping its exchange of said non-secret hash whenever an exchanged piece fails to match its corresponding secret hash piece and each sending a next piece of said non-secret hash when an exchanged piece matches its corresponding secret hash piece;
        said network devices completing said authentication procedure once all desired pieces of said non-secret hashes have been exchanged and no exchanged pieces have failed to match the corresponding secret hash pieces.

12. The network device of claim 11, wherein said network device, upon completing said authentication procedure with another network device, computes a shared master key based on said secret key and a combination of publicly known information.

13. The network device of claim 12, wherein said shared master key secures subsequent communication with said other network device.

14. The network device of claim 11, wherein said authentication procedure further comprises each said network device computing a shared master key based on said secret key and a combination of publicly known information.

15. The network device of claim 11, wherein said piece comprises a plurality of bits.

16. The network device of claim 11, wherein said non-secret hash pieces are sent in order from least significant to most significant.

17. The network device of claim 11, wherein said hash is a publicly standardized hash function.

18. The network device of claim 11, wherein said publicly known information comprises a nonce.

19. The network device of claim 11, wherein said publicly known information comprises an address of one of the network devices.

20. The network device of claim 11, wherein said processor performing said authentication procedure is a hardwired state machine.

21. The network device of claim 11, wherein said processor performing said authentication procedure is based on instructions stored in said machine readable medium.

22. A method for mutual authentication between a first network devices and a second network device, said method comprising:
- exchanging a Diffie-Hellman key with said second network devices to create a shared secret key;
- computing two hashes based on said secret key, two different combinations of publicly known information, and a secret password;
- keeping one of said hashes secret creating a secret hash and a non-secret hash;
- exchanging said non-secret hash one bit at a time with said second network device;
- comparing bits received from said second network device to the corresponding bits within said secret hashes;
- stopping the exchanging of said non-secret hash whenever an exchanged bit fails to match its corresponding secret hash bit and each sending a next bit of said non-secret hash when an exchanged bit matches its corresponding secret hash bit; and
- completing said authentication procedure once all desired bits of said non-secret hashes have been exchanged and no exchanged bits have failed to match the corresponding secret hash bits.

23. The method of claim 22, further comprising computing a shared master key based on said secret key and a combination of publicly known information.

24. The method of claim 22, wherein said hash result bits are sent in order from least significant to most significant.

25. The method of claim 22, wherein said hash is a publicly standardized hash function.

26. The method of claim 22, wherein said publicly known information comprises a nonce.

27. The method of claim 22, wherein said publicly known information comprises an address of a network device performing the protocol.

28. An authentication method performed by two network devices comprising:
- a Diffie-Hellman key exchange between the two network devices to create a shared secret key;
- each said network device using said shared secret key to compute two hashes based on distinct combinations of public information and a secret password;
- each said network device dividing resulting bits of said hashes into two distinct complimentary sets;
- each said network device keeping a distinct complimentary set secret;
- each network device sending a bit of its non-secret set to the other device;
- each network device checking said received bit against the corresponding secret bit;
- each network device stopping sending more bits of its non-secret set if corresponding bits fail to match;
- each network device sending another bit of its non-secret set if the bits match until all desired bits are sent and matched or a mismatch occurred; and
- said network devices completing mutual authentication once all desired bits are sent and matched.

29. The method of claim 28, further comprising:
- each of said network devices computing a shared master key based on said secret key and a combination of publicly known information upon completing mutual authentication.

30. A method for mutual authentication of network devices comprising:
- a first network device and a second network device performing a Diffie-Hellman key exchange to create a shared secret key;
- said first and second network devices each computing two hashes using a shared secret key, two different combinations of publicly known information, and a secret password;
- said first network device keeping said first hash secret and said second network device keeping said second hash secret;
- said network devices exchanging their respective non-secret hash results one bit at a time;
- each of said network devices comparing said exchanged bits to the corresponding bits within said secret hashes;
- each of said network devices stopping sending more bits of its non-secret hash whenever an exchanged bit fails to match its corresponding secret bit and sending the next bit of its non-secret hash when an exchanged bit matches its corresponding secret bit; and
- said network devices completing mutual authentication once all required bits have been exchanged and no exchanged bits have failed to match the corresponding secret bits.

31. The method of claim 30, further comprising:
- each of said network devices computing a shared master key based on said secret key and a combination of publicly known information upon completing mutual authentication.

* * * * *